United States Patent Office 3,138,613
Patented June 23, 1964

3,138,613
VATTABLE DIANTHRIMIDE CARBAZOLE DYESTUFFS
Kurt Weber and Max Staeuble, Basel, Switzerland, assignors to Ciba Limited, Basel, Switzerland, a company of Switzerland
No Drawing. Filed Nov. 28, 1961, Ser. No. 155,478
Claims priority, application Switzerland Nov. 29, 1960
7 Claims. (Cl. 260—316)

This invention relates to valuable new vat dyestuffs of the formula (1)
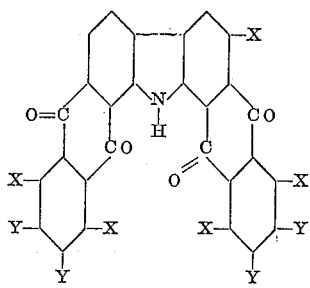

wherein at least one X represents a carboxylic acid amide group linked through its nitrogen atom to a chromophore, the other X's represent hydrogen atoms or the usual constituents, such as halogen atoms, alkyl or alkoxy groups or reactive groups, especially chlorotriazinyl or chloropyrimidyl groups, and the Y's represent halogen or hydrogen atoms, and wherein at least one carboxylic acid amide group contains one or two sulfonic acid groups.

The dyestuffs of this invention are prepared (a) by carbazolation of the corresponding anthrimides of the formula (2)
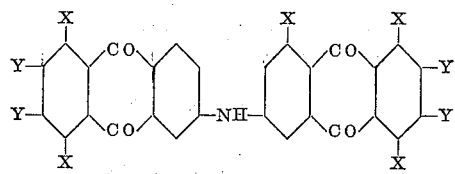

wherein the meanings of the symbols X and Y can be inferred from those given for Formula 1, or
(b) by sulfonation of the anthrimide carbazoles of Formula 1 having no sulfonic acid groups, or
(c) by sulfonating carbazolation of anthrimides of Formula 2 having no sulfonic acid groups, or
(d) by acylation of aminodianthrimide carbazoles.

The compounds for Formula 1 which have no sulfonic acid groups and are to be sulfonated can be obtained for example by reacting substituted or unsubstituted 1-halogen-5- or -8-aroylaminoanthraquinones with 1-amino-4-, -5- or -8 - aroylaminoanthraquinones, and carbazolating the resulting aroylamino dianthrimides; the aroylamino groups may be derived from aromatic carboxylic acid halides (such as, for example, benzoyl chloride, ortho-, meta-, or para-chlorobenzoyl chloride, diphenyl carboxylic acid chloride, naphthoyl chloride, diphenylmethane carboxylic acid chloride, diphenyloxy carboxylic acid chloride, cinnamic acid chloride, cinnamic acid bromide, and the like).

The acylaminodianthrimides of the Formula 2 which contain sulfonic acid groups and are used for process (a) can be made, e.g. by acylating corresponding aminodianthrimides or diaminodianthrimides by means of sulfocarboxylic acid halides, e.g. sulfofuran carboxylic acid chloride, sulfothiophene carboxylic acid chloride, sulfonaphthalene carboxylic acid chloride, sulfobenzoyl chloride, and the like. The starting materials of Formula 2 are also obtained when the carboxysulfonic acid halides are used in tertiary bases.

In the present process, which leads to products having sulfonic acid groups, the carbazolation is advantageously carried out by means of concentrated sulfuric acid or oleum by per se conventional methods with the optional addition of oxidants, such as chromates, Javelle water, etc. When the starting material is free from sulfonic acid groups, simultaneous or subsequent sulfonation is required. For this operation, oleum or chlorosulfonic acid can be used, or even concentrated sulfuric acid, during or after the carbazolation if the starting material contains readily sulfonatable acylamino groups, e.g. diphenyl carbonamide groups.

According to modification (d) of the process, the dyestuffs of this invention are obtained e.g. by acylating aminodianthrimide carbazoles of the formula

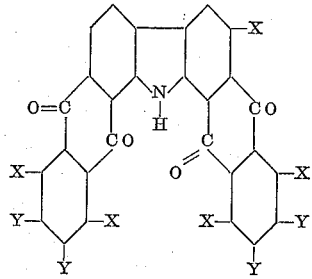

wherein at least one X stands for an acylatable amino group and the other X's for hydrogen atoms, and the Y's for halogen or hydrogen atoms, by means of acylating agents containing a sulfonic acid group or a group convertible thereinto, e.g. a sulfohalide group which is saponified during or after the acylation.

Apart from the aforementioned sulfocarboxylic acid halides there may be used as acylating agents also dihalides of sulfocarboxylic acids, such as sulfobenzoic acid dichloride, whereas when carboxyarylsulfonic acid halides in tertiary bases are used, the desired sulfoaroylaminodianthrimide carbazoles of Formula 1 are also formed when aminodianthrimide carbazoles are acylated. Such carbazoles may be, for example:

4,8-diamino-1,1'-dianthrimide carbazole,
4,8'-diamino-1,1'-dianthrimide carbazole,
4,5'-diamino-1,1'-dianthrimide carbazole,
5,5'-diamino-1,1'-dianthrimide carbazole,
5,8'-diamino-1,1'-dianthrimide carbazole.

According to this invention, the reaction of the aforementioned acylating agents with the dianthrimide carbazoles which contain amino groups can be performed in an inert organic solvent, for example, nitrobenzene, chlorobenzene, or ortho-dichlorobenzene, at a raised temperature. In many cases, however, it is of advantage to perform it in tertiary bases, such as pyridine and/or in the presence of acid-binding agents, such, for example, as sodium acetate, sodium hydroxide, or sodium carbonate. The molecular ratio of the components as advantageously so selected that for each acylatable amino group of the dyestuff to be condensed there is used at least one mol of the acylating agent.

The new dyestuffs are also obtained when an acylamino-dianthrimide carbazole of the Formula 1 in which at least one acylamino group contains an HS grouping, e.g. an HS—CH$_2$-grouping, is treated with an oxidant until the HS-group is converted into an HO$_3$S-grouping.

The vat dyestuffs of this invention are suitable for dyeing a wide variety of materials, such as synthetic or natural fibers, especially for dyeing or printing textile materials of natural or regenerated cellulose by the usual vat dyeing and printing processes. The resulting dyeings and prints are mostly fast to chlorine and are distinguished by their excellent light and wet fastness, especially their fastness to boiling soda.

The dyeings obtained with the dyestuffs of the invention are also fast to dry cleaning and to migration. The dyed fabrics can be coated with artificial resins, for example with polyvinyl chloride without the dyestuff migrating into the plastic material. Such feature is particularly important in the case of artificial leather.

As compared to the conventional vat dyestuffs, the permanently water-soluble vat dyestuffs of the invention present the advantage of a superior levelling and penetrating capacity; in machine dyeing, foam formation does not lead to faulty dyeings owing to the precipitation of re-oxidized dyestuff; in the dyeing of wound packages, for example, cross-wound bobbins or knitted goods in a reeling vat, the pigmentation which is necessary in the case of conventional vat dyestuffs is unnecessary when the new dyes are used; for the rapid padding methods the new dyes can be used in the form of solutions and need not be in a highly dispersed commercial form or any particular paste form, thus avoiding the usual disadvantages, such as instability of the paste, dusting, or one or more operations to prepare finely disperse powder. Finally, they are as a rule easy to vat, in many cases even at room temperature and, where necessary, with mild reducing agents. They are very readily soluble in the vat and produce strong and very level dyeings, especially on regenerated cellulose, which are of the same shade as the corresponding cotton dyeings.

The following examples illustrate the invention, the parts being by weight unless otherwise stated, the percentages being by weight, and the temperatures being indicated in degrees centigrade. Parts by weight bear the same relation to parts by volume as does the gram to the milliliter.

EXAMPLE 1

22.1 parts of benzoic acid-para-sulfochloride are introduced into 200 parts of anhydrous pyridine and the mixture heated to 100°. 11.4 parts of 5,5'-diamino-1,1'-dianthrimide carbazole are then added and the whole stirred for 4 hours while being heated at 100–110°. The product which crystallizes is isolated by filtration, suspended in 1500 parts of water at 60–70°, and rendered exactly neutral with sodium hydroxide solution. 300 parts of sodium chloride are added, the solution then filtered, and the filter cake dried. In the form of its free acid, the new dyestuff so obtained corresponds to the formula

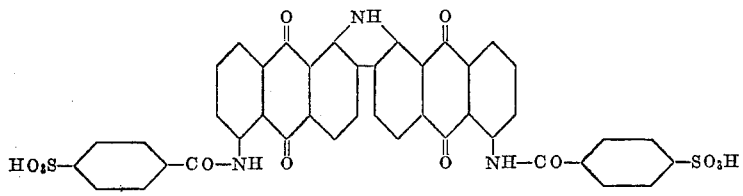

and dissolves completely in water with a yellow coloration.

When the benzoic acid-para-sulfochloride used in this example is replaced by the same quantity of benzoic acid-meta-sulfochloride or benzoyl chloride sulfonic acid, or an equivalent quantity of thiophene-2-carboxylic acid-5-sulfochloride, similar dyestuffs are obtained which also dye cotton golden orange tints of excellent fastness.

*Dyeing Method*

0.2 part of dyestuff is dissolved in 50 parts of water. The resulting yellow solution is poured into a solution of 2 parts by volume of a 30% sodium hydroxide solution and 1,2 parts sodium hydrosulfite at 50°; 10 parts of cotton are entered immediately and dyed for 45 minutes at 50° with the addition of 12 parts of sodium chloride. The dyeing operation is followed by oxidation, washing, acidification, thorough rinsing, and soaping at the boil.

EXAMPLE 2

2 parts of the dyestuff of the formula

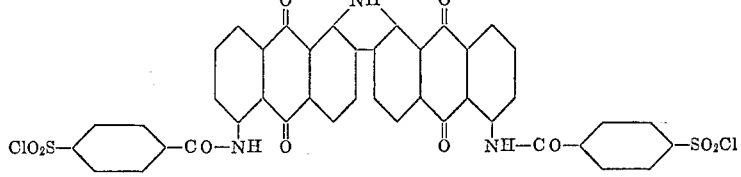

obtained by diacylating 5,5'-diamino-1,1'-dianthrimide carbazole with the dichloride of para-sulfobenzoic acid in nitrobenzene at 120° are suspended in 200 parts of water. At 50–60°, 6 parts by volume of a sodium hydroxide solution of 30% strength and 3 parts of sodium hydrosulfite are stirred in. The resulting vat is maintained at 50–60° for 30 minutes. Then air is introduced until oxidation is complete. After the addition of 10 parts of sodium chloride, the precipitated product is isolated by filtration, washed with an aqueous sodium chloride solution of 5% strength, and dried under reduced pressure.

The water-soluble dyestuff so obtained corresponds to that described in Example 1 and gives likewise golden orange dyeings of excellent fastness.

EXAMPLE 3

7 parts of the dyestuff of the formula

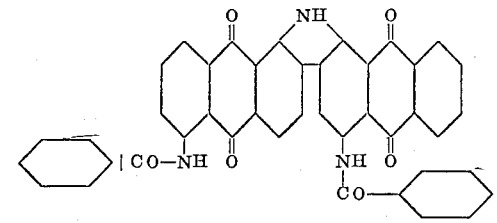

are dissolved in 180 parts of oleum with an SO$_3$ content of 10%. The solution is then stirred at 50–55° for one hour, and at 80–85° for three hours. After cooling, the reaction mixture is poured onto a mixture of ice and water, and the precipitated product separated by filtration. The moist filter cake is dissolved in about 1000 parts of water at 40°, neutralized with sodium hydroxide solution, and the neutral solution evaporated to dryness under reduced pressure.

The new vat dyestuff sulfonic acid, when used according to the dyeing method described in Example 1, gives brown dyeings having excellent fastness properties.

EXAMPLE 4

4 parts of the dianthrimide of the formula

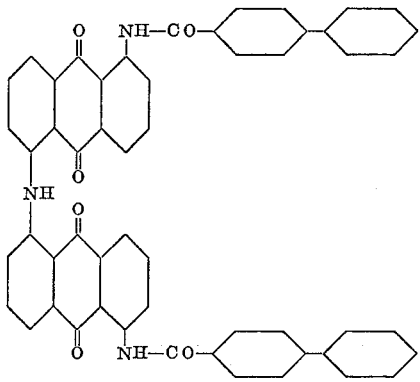

are dissolved at room temperature in 180 parts of sulfuric acid of 100% strength, and stirred for 5 hours at that temperature, the initial olive brown color of the solution turning blue. The solution is then cautiously poured onto 540 parts of ice, the brown suspension heated to 65–70°, and 1 part of sodium bichromate added. The suspension becomes orange-brown. After one hour, 1 more part of sodium bichromate is added and the mixture stirred for another hour at 65–70°, after which the procedure is repeated until a total of 4 parts of sodium bichromate has been added. After the addition of the last portion, the temperature is maintained at 65–70° for 3 hours. After cooling, the reaction mixture is filtered, the orange-colored residue suspended in 500 parts of water, and the suspension neutralized with sodium hydroxide solution. The neutral suspension is filtered again and washed with an aqueous sodium chloride solution of 5% strength. The residue is suspended in 300 parts of water and given pH of 9 with sodium hydroxide solution. The suspension is then heated to 90° and 5 parts by volume of Javelle water added, and the whole is stirred at 90° until the reaction to potassium iodide starch paper is negative. Five more parts by volume of Javelle water are then added, and the procedure repeated until the reaction to potassium iodide starch paper remains positive for 2 hours. Total consumption: about 50 parts by volume of Javelle water. After cooling, the reaction mass is filtered, the separated dyestuff washed with sodium chloride solution of 5% strength, washed neutral and dried.

In its free acid form the new vat dyestuff corresponds to the formula

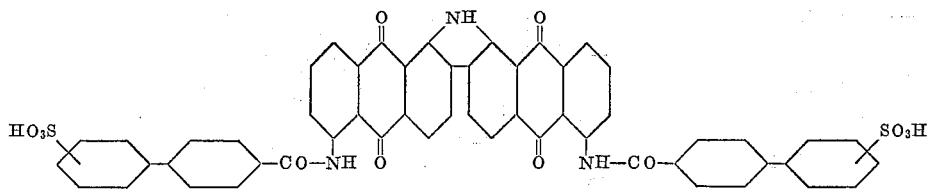

When used for dyeing by the method described in Example 1, but at a dyeing temperature of 60–80°, this dyestuff yields vigorous, pure golden-orange dyeings of excellent fastness.

The same dyestuff can also be obtained as follows: 4 parts of the starting anthrimide are dissolved in 180 parts of sulfuric acid of 96% strength and stirred for 22 hours at room temperature during which time the initial olive-brown coloration of the solution turns blue. While cooling, 55 parts of oleum having an $SO_3$ content of 66% is added in such manner that the temperature does not rise above 25°, after which stirring at room temperature is continued for 6 hours. The product is worked up as described in the first paragraph of this example.

The starting dianthrimide can be obtained as follows: 8.4 parts of the compound of the formula

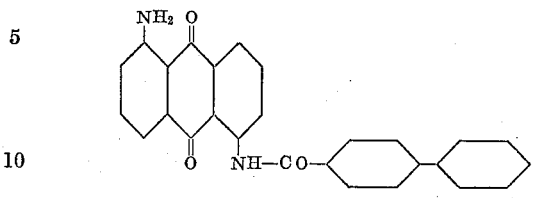

and 8.8 parts of the compound of the formula

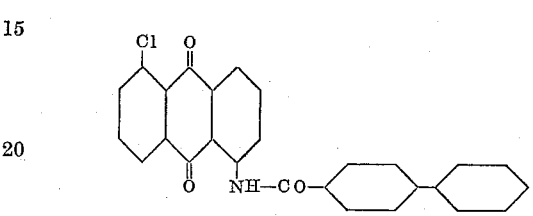

in 250 parts of nitrobenzene to which 8.4 parts of calcined sodium carbonate and 0.5 part of copper-I-chloride have been added, are refluxed for 6 hours at the boiling temperature of the reaction mixture. After cooling to 100°, the reaction mixture is filtered and the filter cake washed in turn with nitrobenzene, benzene, and alcohol. The red-brown residue is kept in 1000 parts of boiling water, separated by filtration, washed with hot water and dried.

When the 1-chloro-5-acylaminoanthraquinone used according to the preceding paragraph is replaced by the compound of the formula

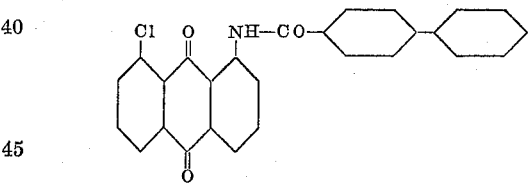

an anthrimide is obtained from which by sulfonation and carbazole ring closure according to the first paragraph of this example a dyestuff is obtained which likewise gives orange vat dyeings.

EXAMPLE 5

5.0 parts of 2-mercapto-benzthiazole carboxylic acid-(6), 50 parts of thionyl chloride, and 0.1 part of dimethyl formamide are refluxed until a clear solution is obtained. The excess thionyl chloride is then distilled off under reduced pressure and the residual 2-mercapto-benzthiazole-6-carboxylic acid chloride is dissolved in 200 parts of trichlorobenzene while heating to 100°. 4.5 parts of 5,5'-diamino-1,1'-dianthrimide carbazole are introduced into the resulting solution and the mixture maintained at 130–

135° for 6 hours, then at 160° for 2 hours. After cooling, the condensation product of the formula

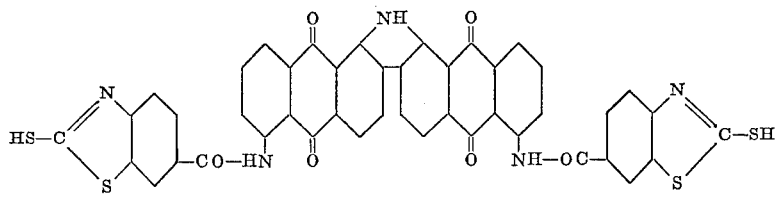

is isolated by filtration and dried in vacuo at 80°.

5 parts of the dimercapto compound so obtained are vatted by being dissolved in 500 parts of water containing 10 parts of sodium hydroxide solution of 30% strength and 5 parts of sodium dithionite at 50–60°. With good stirring, the resulting solution is run into 500 parts of a hydrogen peroxide solution of 15% strength, and the temperature maintained at 40° for 3 hours. The dyestuff is then salted out completely by the addition of 100 parts of sodium chloride, isolated by filtration, and dried at 80° under reduced pressure.

The resulting dyestuff of the formula

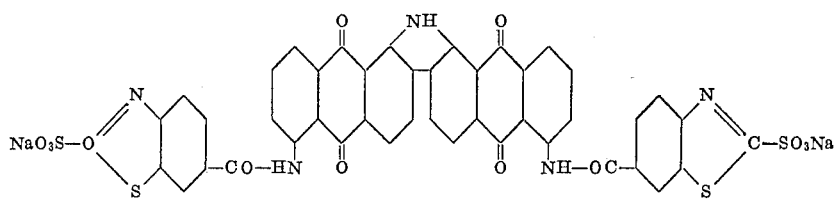

dyes cotton and regenerated cellulose from an alkaline hydrosulfite vat brown-yellow tints of very good fastness to light, washing and boiling soda.

What is claimed is:
1. A vat dyestuff of the formula:

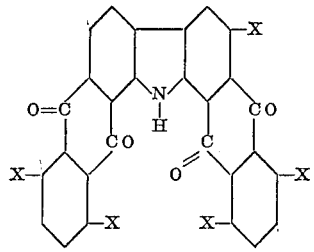

wherein at least one and at most two of the X substituents are members selected from the group consisting of sulfobenzoyl-amino, sulphonaphthoylamino,

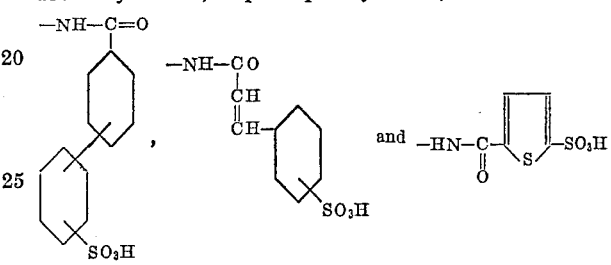

and the remaining X substituents are hydrogen.

2. α:α'-di-(sulfobenzoylamino)-dianthrimide-carbazole.
3. The dyestuff of the formula

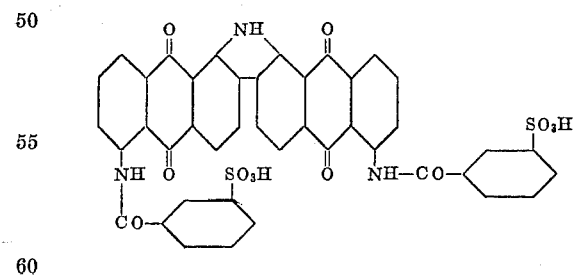

4. The dyestuff of the formula

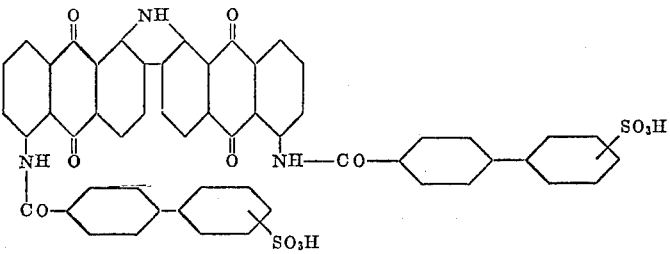

5. The dyestuff of the formula
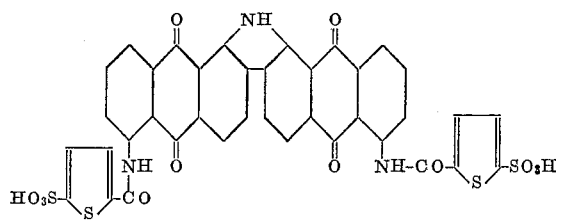
6. The dyestuff of the formula
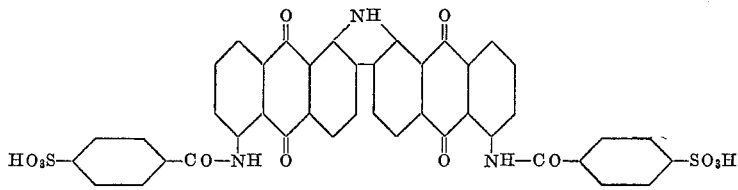
7. The dyestuff obtained by sulfonating the carbazole of the formula
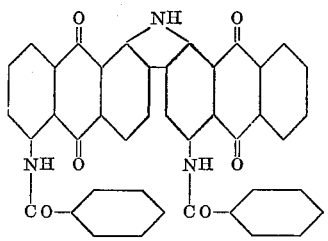
References Cited in the file of this patent
UNITED STATES PATENTS
| | | |
|---|---|---|
| 2,032,520 | Wuertz et al. | Mar. 3, 1936 |
| 2,453,232 | Kern et al. | Nov. 9, 1948 |
| 2,563,819 | Coffey et al. | Aug. 14, 1951 |
| 2,837,530 | Oppliger et al. | June 3, 1958 |
| 2,958,696 | Eckert et al. | Nov. 1, 1960 |
| 3,006,923 | Fuchs et al. | Oct. 31, 1961 |
FOREIGN PATENTS
| | | |
|---|---|---|
| 704,013 | Great Britain | Feb. 17, 1954 |